United States Patent [19]

Carney

[11] Patent Number: 5,193,443
[45] Date of Patent: Mar. 16, 1993

[54] SKEWER FOR BARBECUING

[76] Inventor: Jeffrey A. Carney, 1865 E. Broadway #158, Tempe, Ariz. 85282

[21] Appl. No.: 840,136

[22] Filed: Feb. 24, 1992

[51] Int. Cl.⁵ .............................................. A47J 37/04
[52] U.S. Cl. .................................... 99/419; 99/421 A; 99/421 H; 99/449; 211/125
[58] Field of Search ...................... 99/449, 419, 421 R, 99/421 A, 421 H, 421 HH, 421 HV; 211/125

[56] References Cited

U.S. PATENT DOCUMENTS

| 3,329,082 | 7/1967 | Satkunas | 211/125 |
|---|---|---|---|
| 4,483,241 | 11/1984 | Vaughn | 99/449 |
| 5,009,151 | 4/1991 | Hungerford | 99/449 |

FOREIGN PATENT DOCUMENTS

| 151422 | 2/1903 | Fed. Rep. of Germany | 99/421 HV |
|---|---|---|---|
| 478044 | 1/1938 | United Kingdom | 99/419 |

Primary Examiner—Harvey C. Hornsby
Assistant Examiner—Mark Spisich
Attorney, Agent, or Firm—Gregory J. Nelson

[57] ABSTRACT

A skewer device for barbecue cooking foods such as shish-kabob. The skewer device has a rod to which the food is attached and a pair of support members slidably retained on the rod at opposite ends of the food arrangement. The support members are ring-like in the preferred embodiment and elevate the food above the cooking surface. The support members loosely fit on the skewer so they may be tilted to frictionally engage the rod to secure the food and lock the members relative to the rod.

6 Claims, 1 Drawing Sheet

SKEWER FOR BARBECUING

The present invention relates to a barbecue accessory and more particularly relates to a skewer device for holding food such as shish-kabobs in a cooking position on a barbecue grill.

Barbecue cooking is a very popular method of cooking. One particular type of food which is traditionally barbecued are shish-kabobs which originated in the Middle East and consist of pieces of meat, such as veal, lamb, chicken or beef, arranged on a skewer and cooked on a grill over coals or a flame usually after marinating. The problem when cooking such foods on a barbecue is that the food often sticks to the grill surface causing the food to cook unevenly and further causing parts of the food to be torn away when the skewer is turned or moved.

As a result, several barbecuing accessories or appliances can be found in the prior art which provide a support for the skewer to hold the skewer at an elevation above the cooking surface so that the food does not contact the grill surface. A representative device of this type is shown in U.S. Pat. No. Des. 251,128 which shows a shish-kabob kit having a pair of spaced-apart supports with notches in the supports which receive the opposite ends of the skewer to support it in the manner described above. While these types of devices are helpful, they present several disadvantages. One is that these devices are generally metal and will dissipate or draw heat away from the cooking surface. Further, the devices are restrictive in that they do not allow the chef to use the entire grill surface for shish-kaboing but restrict use to the area on which the support kit device is placed.

Accordingly, there exists a need for an improved barbecue accessory, particularly for the preparation of foods such as shish-kabobs.

Briefly, the present invention presents a barbecue cooking skewer device which has an elongate skewer rod which may be round, square or other geometric shape. The skewer rod is sharpened at one end and preferably is formed having a handle on the other end for the convenience of the user. Each skewer device is provided with a pair of retainer and support members. In the preferred embodiment, the retainer and support members are in the form of circular disks having a centrally positioned aperture which axially receives the skewer rod. The relationship of the aperture to the skewer rod is such that loose relative fit is achieved so that the retainer support member may be pivoted into a locking engagement with the skewer rod. The retainer support members serve to support the skewer rod and food on the skewer rod at an elevation above the barbecue grill surface. The retainer support elements also help to maintain the food on the skewer rod and allow the food to be easily turned for uniform cooking.

The retainer/support elements may be of various shapes, preferably round or may be polygonal.

The above and other objects and advantages of the present invention will become more apparent from the following description and claims taken in conjunction with the drawings in which:

Figure 1:
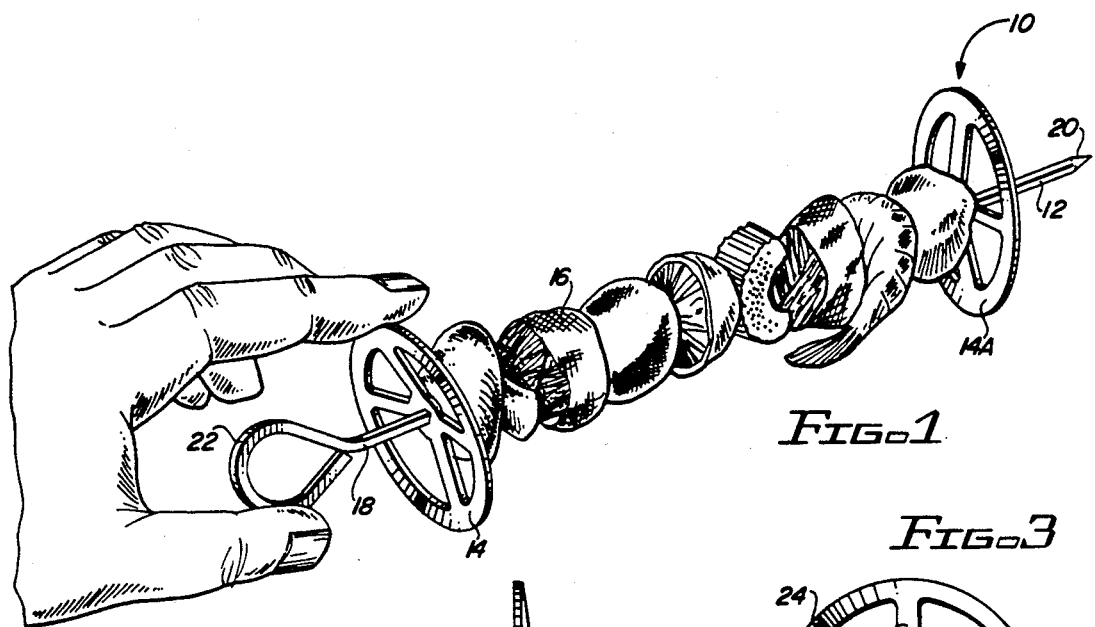
FIG. 1 is a perspective view of the skewer device of the present invention with food secured on the skewer rod and being shown in the hand of a user.

Turning now to the drawings, the skewer device is generally designated by the numeral 10 and includes a skewer rod 12 and a pair of retainer support members 14 and 14A, also termed supports or members for convenience. The members 14 and 14A are essentially identical. As shown in FIG. 1, the skewer device secures a number of food items 16, such as assorted vegetables and meat for cooking on the grill surface of a barbecue such as a charcoal or gas barbecue, not shown. The grill surface usually consists of a plurality of spaced-apart stainless steel rods or cast iron elements.

The skewer rod 12 is of a suitable material such as stainless steel and has an axially extending shaft portion 18. The distal end of the rod is provided with a piercing point 20 and the proximal end is formed into a handle 22 which is shown as a loop to facilitate easy handling and grasping by the user. The skewer rod is shown having a square cross section but may be any convenient cross section such as round or multi-sided. The multi-sided or polygonal configuration is preferred because such a configuration will secure the retainer support members 14 and 14A against relative rotation with respect to the skewer rod and will also secure the food to prevent it from spinning on the skewer during rotation of the skewer.

The skewer rod as shown is fabricated by conventional techniques being formed of square stock, as for example 0.105". The milled rod is then cut into a suitable length, 12" being typical. The distal end of the rod 20 is ground into a point suitable for piercing the food. The opposite proximal end is formed into a loop by wire bending. The loop shown is a symmetrical loop of approximately one inch in diameter which, as indicated above, serves as a handle. The skewer may be formed from a stainless steel or may be suitably plated to render it corrosion resistant and safe for use with food.

The retainer support members 14 and 14A are unique. The skewer rod, as described above, is more or less conventional. The retainer support members 14 and 14A may be used with existing skewer rods. The retainer support members as shown in FIGS. 2-5 have a circular exterior configuration having an outer ring 24 and a plurality of radially extending arms or spokes 26 connecting to the ring 24 and a central hub 28. As best seen in FIG. 4, the central hub defines an aperture 30 which has a configuration conforming to the cross sectional configuration of the skewer rod with which the retainer support members are to be used. The aperture 30 is sized with respect to the cross-sectional configuration of the skewer rod so that a loose fit exists as seen in FIG. 4. The loose fit will allow the members 14 and 14A to be easily slid along the rod generally perpendicular thereto as shown in dotted in FIG. 5. When the retainer support members 14 and 14A are positioned on the skewer rod at spaced-apart locations at opposite ends of a food arrangement as shown in FIG. 1, the members 14 and 14A may be pivoted slightly to the position shown in full lines in FIG. 5. This brings edges 30A and 30B of aperture 30 into engagement with the opposed surfaces of the skewer rod. Frictional engagement will serve to lock the support retainer member against axial displacement when the members are placed on the grill surface. FIG. 1 also illustrates the manual tilting of retainer support members and locking position. It is also helpful if a piece of food, preferably meat, is placed at either side of members 14 and 14A to assist in maintaining these members in place on the skewer.

Once the skewer assembly has been arranged, as shown in FIG. 1, it is placed on a grill surface and the retainer support members serve to elevate the skewer rod and attached food in a position above the grill surface to prevent burning, uneven cooking and sticking. The elements being metal also serve to conduct heat to the skewer rods so that heat is conducted along the rod to the center of the food items for more even cooking. The skewer assembly is also stable since the outer edge of the ring 24 will seat between adjacent grill surface members 52 and 54 as seen in FIG. 3.

The skewer assembly also facilitates easy handling as the skewer assembly may be eaisly manually grasped and moved to and from or about the cooking surface manually or by use of cooking tongs. With the member 14 tilted as seen in FIG. 1, the member 14 is locked against movement relative to the rod.

Figure 2:
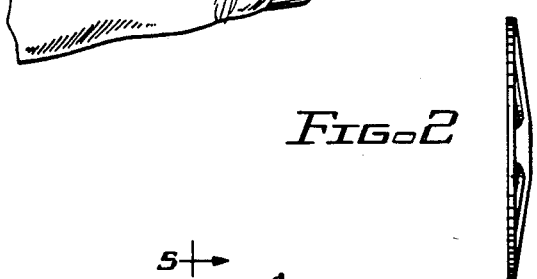
FIG. 2 is a side view of one of the retainer support members.
Figure 3:
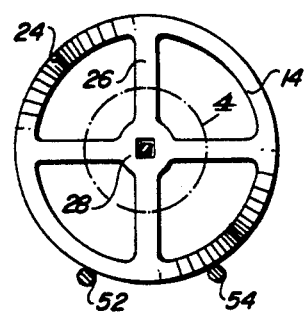
FIG. 3 is a front view of the retainer support member of FIG. 2.
Figure 4:
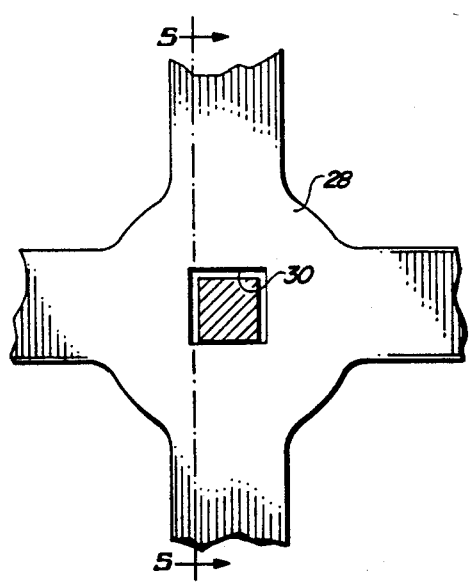
FIG. 4 is an enlarged detail view of the hub of the retainer member as indicated in FIG. 3.
Figure 5:
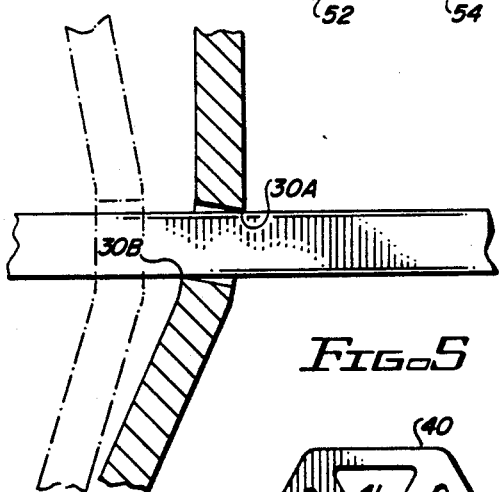
FIG. 5 is a sectional view taken along line 5—5 of FIG. 4 showing the retainer support member in a locked position in solid lines and in the sliding position in dotted lines.

The retainer support member, as shown in FIG. 3, can be fabricated by conventional methods such as suitable stamping, using a die on a hydraulic press. Typical material is 1/16" steel material with the resulting circular retainer support having typically a diameter of approximately 2¼" with a rim of ⅛" in width. However, the member may be of various diameters. The spokes 26 are typically ⅛" in width and are placed 90° apart about the hub. The material of the members may be stainless steel or may be steel suitably plated for corrosion resistance and compatibility with food handling. The dome shape seen in FIG. 2 is caused by the stamping of the metal during the manufacturing process. The rings could also be flat.

Figure 6:
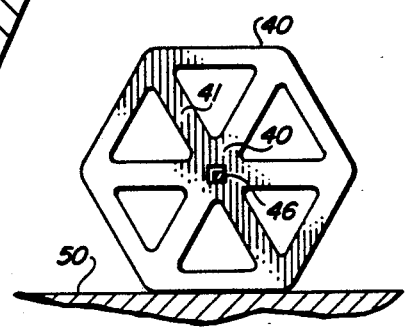
FIG. 6 is a plan view of an alternate configuration of the retainer support member.

FIG. 6 shows an alternate embodiment of the retainer support member. The embodiment of FIG. 6 is generally designated by the numeral 40 and has an outer rim which is non-circular being hexagonal with a plurality of radial arms 42 extending to a center hub 44 which defines an aperture 46 which is configured to loosely fit about the associated skewer rod. One advantage of the polygonal configuration of the member shown in FIG. 6 is that this configuration will resist turning with respect to a planar grill surface 50.

Thus, it will be seen that the foregoing invention provides a unique cooking accessory which will elevate shish-kabobs and similar food items above the grilling surface, eliminating charring, sticking and also preventing smaller food items from falling from the skewer rod and through the grill wires. The device allows easy rotation of the food and achieves even cooking of the food, permitting the chef great versatility in selection of food items to be cooked.

It will be obvious to those skilled in the art to make various changes, alterations and modifications to the invention described herein. To the extent such changes, alterations and modifications do not depart from the spirit and scope of the appended claims, they are intended to be encompassed therein.

I claim:

1. A cooking device for cooking food over a cooking surface comprising:
   (a) a skewer rod having elongated shaft of predetermined cross sectional configuration; and
   (b) a pair of support members, each having a body with a perimeter defining an aperture sized to loosely fit on said shaft whereby said pair of support members may be placed at spaced apart locations on said skewer rod with food items therebetween and said support members may be tilted relative to said skewer rod to frictionally engage same to secure said support members relative to said skewer rod said support members each having first and second opposite sides between which each respective aperture extends and said apertures are sized such that, when said support members are tilted, said skewer rod is adapted to contact a first edge on the first side of a respective support member located on top of the skewer and to contact a second edge on the second side of the same support member located below the skewer while there is no engagement between the skewer and the respective edges of the respective support member which are located on the first side of the respective support member and located below the skewer and on the second side of the respective support member located above the skewer.

2. The cooking device of claim 6 wherein each said support member has a circular body.

3. The cooking device of claim 2 wherein each said support member has a circular outer ring with a plurality of radially-extending spokes connected to a centrally positioned hub, said hub defining an aperture having a shape corresponding to said cross-sectional configuration of said skewer rod.

4. The cooking device of claim 1 wherein each said support member is fabricated from a heat-conductive material.

5. The cooking device of claim 1 wherein each said support member is fabricated from stamped steel and is plated.

6. The cooking device of claim 1 wherein said skewer rod is provided with a piercing point at one end thereof and handle means at the other end thereof.

* * * * *